Aug. 6, 1957  T. S. MERTES ET AL  2,801,966
TRANSFER OF GRANULAR SOLIDS
Filed July 16, 1954
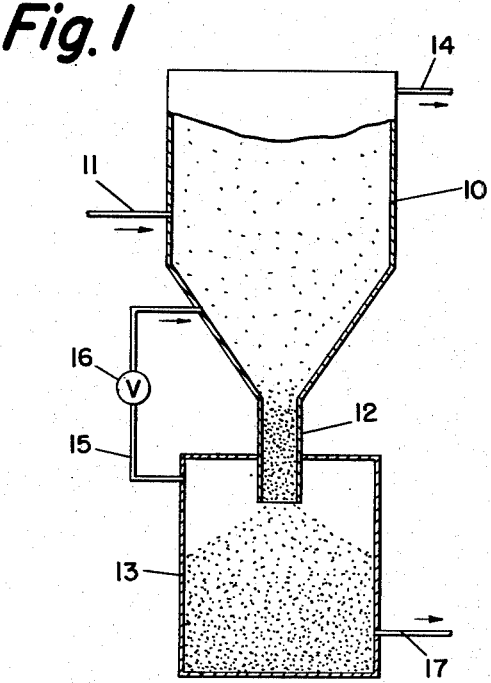
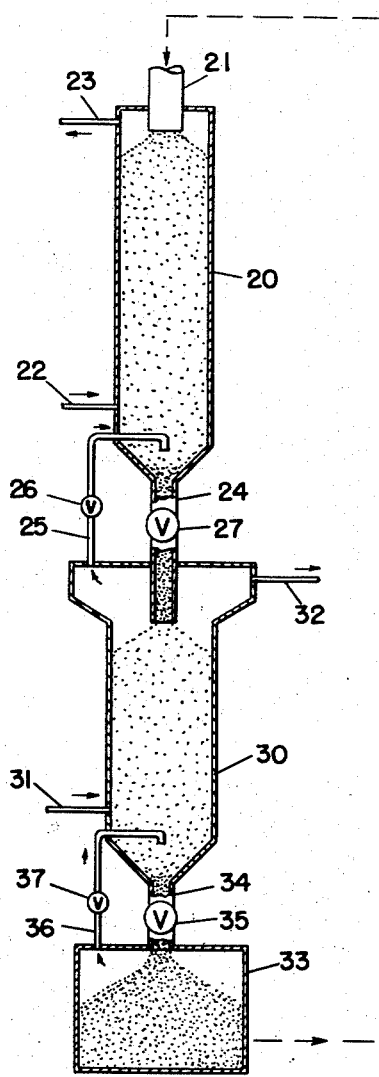
INVENTORS.
THOMAS S. MERTES
HARRISON B. RHODES
BY
ATTORNEY

United States Patent Office 2,801,966
Patented Aug. 6, 1957

2,801,966

TRANSFER OF GRANULAR SOLIDS

Thomas S. Mertes, Wilmington, Del., and Harrison B. Rhodes, Paramus, N. J., assignors to Sun Oil Company, Philadelphia, Pa., a corporation of New Jersey Application July 16, 1954, Serial No. 443,808

4 Claims. (Cl. 210—33)

This invention relates to the passage of particulate or granular solids through a system containing a fluid medium. More particularly, the invention is directed to a manner of transferring such solid particles between two interconnected zones while avoiding or minimizing any net flow of fluid between the zones.

There are many industrial operations in which a particulate or granular solid material is in contact with a gas or liquid medium during one stage of the operation, following which the particulate solid is separated from the fluid medium and removed to another zone. In numerous cases the solid material is then contacted in a second stage with a different fluid medium and again separated. Operations of this kind present problems with respect to the transfer of the granular solid material from one zone to another, especially where it is desired to avoid transferring between the zones liquid or gas with which the solid particles are in contact in the first zone.

The present invention is directed to operations within th general category referred to above, and it provides a simple and accurate manner of regulating the transfer of granular solids between two vessels positioned at different levels, while avoiding any substantial net transfer of fluid between the vessels.

Examples of operations in which the invention is useful are the treatment of organic fluids with solid adsorptive materials, such as the decolorization of oils by means of adsorptive clays, or the separation of hydrocarbons or other organic compounds by means of silica gel, activated carbon, activated alumina, or other selective adsorbents. Other examples wherein the invention has utility are the treatment of water and other aqueous media by means of ion exchange resins, and the separation of solids from treated sewage.

The invention more particularly is applicable to a system involving an upper zone and a lower zone which communicate with each other through a passageway of restricted cross-section, such as two vessels positioned one above the other and connected by a pipe. Each zone contains a fluid, which may be either a liquid or a gas and which has a different density from that of the solid particles; and the particles gravitate through the fluid in one zone to the passageway leading to the other zone. The direction of gravitational movement of the solid particles in the system depends upon whether the density of the solid is greater or less than that of the fluid. In most applications of the invention, the solid particles will be heavier than the fluid; hence their movement will be downwardly from the upper zone to the lower zone. The invention, however, is equally applicable where the fluid is heavier than the particles so that they will gravitate upwardly through the system. For purpose of description, however, it will be assumed that the fluid in the system is liquid and that the solid material is heavier than the liquid so that the particles gravitate downwardly.

In conventional practice the rate of transfer of a granular material from an upper vessel through a relatively narrow passageway such as a pipe to a lower vessel, without any net flow of liquid between the vessels, is greatly limited by the cross-sectional area of the transfer pipe. This is due to the fact that there is a limiting rate at which the granular particles or mass can gravitate through a relatively static liquid leg. The present invention overcomes this difficulty by permitting the granular material to be transferred from one vessel to the other at a considerably higher rate than otherwise could be secured. Furthermore, the invention provides a simple manner by which the rate of transfer of the solids between the vessels can be accurately regulated and controlled.

According to the invention, liquid is permitted to pass from the upper zone to the lower zone along with the gravitating solid particles. This liquid is then separated from the solid particles and sent through a by-pass line directly back to the upper zone. The kinetic energy of the solid particles gravitating to and through the solids transfer line is utilized as the driving force for effecting the return of the transferred liquid, after its separation from the solids, through the by-pass line back to the upper zone. The by-pass line is provided with a valve for regulating the liquid return flow, and the regulation of such liquid return rate in turn controls the rate of transfer of solids from the upper to the lower vessel.

The invention is more specifically described with reference to the accompanying drawings in which:

Fig. 1 is a schematic representation of a simple system in which the invention is utilized in the separation and removal of particulate solid material from a liquid; and Fig. 2 is a diagrammatic illustration of a system wherein a granular solid is countercurrently contacted in separate contact zones with different liquids.

Referring now to Fig. 1, numeral 10 represents an upper vessel to which a liquid carrying a particulate or granular solid material is fed through line 11. The liquid may be, for example, treated sewage containing activated sludge which is to be separated for use as fuel or fertilizer, or a chilled liquid containing crystals. Vessel 10 has a tapered bottom which terminates in a transfer line 12 leading to a receiving vessel 13. The bottom is tapered at an angle from the horizontal which is greater than the angle of repose of the granular material to insure its flow along the bottom. Vessel 10 functions as a separator so that the solid material gravitates to the transfer line 12 while clear liquid flows to the top and is removed from the system through line 14.

In transfer line 12 the solid material is in the form of a loose mass of particles in liquid, and the mass, including the liquid, gravitates downwardly into the receiving vessel 13. Therein the granular particles settle into a more densely packed bed form, with the bed being covered by liquid which fills vessel 13. This liquid is returned to the lower part of vessel 10 by means of by-pass line 15 containing valve 16. The settled solid material can be withdrawn from the lower part of vessel 13 in any suitable manner as indicated schematically by line 17, for example, by means of a screw conveyor, bucket elevator lift or other suitable transporting means. If desired, liquid in the interstices of the granular mass can be allowed to drain back to vessel 13 after the material has been removed from the vessel, so that essentially all of the liquid will leave the system through line 14.

In the arrangement shown in Fig. 1, as above-described, the gravitating solids in transfer line 12 supply the energy required to return the liquid through by-pass line 15 to the upper vessel. In other words, the kinetic energy of the particles is utilized to effect a pumping action on the liquid. The rate of transfer of solid material through line 12 can readily be controlled by regulating the rate of liquid return by means of valve 16.

The maximum solids rate that can be achieved by the above-described arrangement will depend upon several factors. One is the difference in densities between the solid and liquid phases. The greater this difference, the greater will be the kinetic energy of the gravitating particles and the greater the solids transfer rate that can be attained. Other factors are the length and diameter of the transfer line 12. An increase in either of these dimensions will permit an increase in the solids transfer rate. Still another is the amount of friction by the liquid in returning through by-pass line 15 and valve 16. This line should be sufficiently large in order that the friction drop through the line itself will not be a limiting factor; thus a solids rate as high as may be desired can be secured and reduction of the rate in any desired amount can easily be effected by regulation of valve 16.

It should be noted that, while there is a downward flow of liquid from the upper to the lower vessel along with the solid particles transferred, practically all of this liquid can be returned through the by-pass line so that there is substantially no net flow of liquid between the vessels. It should be noted further that the system does not require a pump or similar auxiliary equipment for returning liquid to the first vessel, since the gravitating particles supply the necessary energy for this purpose. In practice, it may be desirable to include a valve (not shown) in transfer line 12; but this would be solely for convenience in shutting down or starting up the system and not for regulating the rate of transfer between vessels.

In Fig. 2 a system is illustrated wherein a granular material is circulated through two successive zones for contact with two different liquids. One example of the use of this system is in the softening of water, in which case the granular material is a suitable ion exchange agent, the liquid with which it is contacted in the upper zone is the feed water, and the liquid with which it is treated in the lower zone is a regenerant, such as brine. In this case the liquid flow in either of the zones may be countercurrent to or concurrent with the solids flow.

Another example of the applicability of the system shown in Fig. 2 is the treatment of a hydrocarbon charge, such as a naphtha or lubricating oil fraction, with a selective adsorbent such as silica gel or activated carbon for the purpose of removing aromatic hydrocarbons therefrom. For this purpose, it is desirable to contact the charge countercurrently with the adsorbent, following which the adsorbent is countercurrently contacted in the other zone with a suitable desorbing agent to remove the adsorbed material and regenerate the adsorbent for recycling in the process. An operation conducted in this manner is described in our co-pending application Serial No. 267,466, filed January 21, 1952, now Patent No. 2,745,888. The following description of Fig. 2 is made with particular reference to this type of operation.

In Fig. 2 numerals 20 and 30 indicate, respectively, a countercurrent adsorption column and a countercurrent desorption column. The granular adsorbent is fed to the top of column 20 through line 21 and gravitates downwardly through the two liquids with which it is successively contacted. The charge material, which may be, for example, a naphtha or kerosene fraction, is fed continuously to a lower part of column 20 through line 22 and flows upwardly therein countercurrent to the adsorbent. In the lower column 30 a suitable desorbing liquid, such as pentane, benzene or the like, is introduced through line 31 and it likewise flows upwardly countercurrent to the adsorbent. The non-adsorbed hydrocarbon fraction, which is predominantly saturated hydrocarbons, is withdrawn from the upper part of column 20 through line 23. The hydrocarbons adsorbed by the granular material are displaced therefrom in column 30 by contact with the desorbing agent and a mixture of the desorbed material and desorbing agent is removed through line 32. The mixture may then be subjected to distillation (not shown) to separate the aromatic-rich product and recover the desorbing agent for re-use.

The transfer of the adsorbent between the upper and lower coulmns is effected in the same manner as described in connection with Fig. 1, with a mixture of particles and liquid gravitating through transfer line 24 and the liquid being returned through by-pass line 25. In each of the columns 20 and 30 the gravitating adsorbent can be either in the form of a loose mass or bed, or as more widely dispersed particles falling through the liquid. In the latter case the particles, as they approach the transfer line 24, will tend to settle into a more dense form so that the mixture passing through the transfer line will be a loose mass of particles and liquid as distinguished from a more or less thin dispersion. A volume of liquid approximately equivalent to that which flows down through transfer line 24 is cycled back through by-pass line 25, so that there is substantially no net transfer of liquid between the columns. Control of the solids transfer rate is achieved by utilizing valve 26 in the by-pass line to regulate the rate of liquid circulation. It should be noted that this circulating liquid will be a mixture of charge material fed through line 22 and of the product material withdrawn at line 32, and hence will have a composition intermediate the two.

As shown in Fig. 2, a valve 27 is included in the transfer line 24. This valve is used only in starting and stopping the operation and normally is wide open during operation. It is not required as a means for regulating the rate of solids transfer, since this can be achieved by means of valve 26.

The control means illustrated as valve 26 need not actually be a valve but can take other forms equivalent thereto for the purposes of the invention. For example, a metering pump which can be set to control the liquid flow at a desired rate is particularly useful in a commercial installation. It should be noted, however, that when a metering pump is used instead of a valve, its purpose is not to supply the energy for pumping the cycled liquid but merely as a throttling means to maintain the desired liquid rate. The driving force for cycling the liquid in such case is still derived from the kinetic energy of the falling particles.

Beneath the desorption column 30 a receiving vessel 33 is provided, it being connected to the lower part of the column by means of line 34 containing shut-off valve 35. A by-pass line 36 containing control valve 37 is again provided, and regulation of the rate of solids transfer between the two zones is carried out in the same manner as previously described. The solid particles are removed from vessel 33 in any suitable manner and are subsequently returned, as indicated by dashed line 38, to the top of the system for re-use.

From the foregoing description it should be apparent that the principles of the present invention can be applied in numerous specific embodiments wherein a particulate solid in contact with fluid is to be transferred gravitationally from one zone to another. While the embodiments described above involve systems in which the solid particles have a density higher than that of the fluid, the invention is equally applicable, as previously stated, to systems in which the particle density is less than that of the fluid. In such case the particles will gravitate upwardly through the liquid, and the kinetic energy of the rising particles will serve as the driving force for flowing liquid back from the upper to the lower zone through a by-pass line.

We claim:

1. In a process involving the passage of particulate solids through a system containing fluid and including upper and lower zones communicating with each other through a constantly open passageway of restricted cross-section, the method of transferring the solids between the two zones without substantial net flow of fluid therebetween which comprises maintaining a continuous body of fluid throughout said zones, passing the solids through the first of said zones in the form of particles gravitating through the fluid, passing a mixture comprising a loose mass of solid particles and fluid as a freely gravitating stream through the passageway into the second zone, therein separating fluid from the solid particles, and returning the fluid as a separate stream back to said first zone in amount equivalent to the amount of fluid passing from the first zone to the second zone, such return being effected solely by utilizing as its driving force the kinetic energy of the gravitating solid particles, and regulating the rate of transfer of solids between said zones by variably regulating the rate of return of the separated fluid.

2. In a process involving the passage of particulate solids through a system containing fluid and including upper and lower zones communicating with each other through a constantly open passageway of restricted cross-section, the method of transferring the solids from the upper zone to the lower zone without substantial net flow of fluid therebetween which comprises maintaining a continuous body of fluid throughout said zones, passing the solid particles gravitationally downwardly through the upper zone, passing a mixture comprising a loose mass of solid particles and fluid downwardly as a freely gravitating stream through the passageway into the lower zone, therein separating fluid from the solid particles, and returning the fluid as a separate stream back to the upper zone in amount equivalent to the amount of fluid passing from the upper zone to the lower zone, such return being effected solely by utilizing as its driving force the kinetic energy of the downwardly gravitating solid particles, and regulating the rate of transfer of solids between said zones by variably regulating the rate of return of the separated fluid.

3. Process according to claim 2 wherein said fluid is a liquid.

4. Process of contacting a particulate or granular solid material with a first liquid in an upper zone and then with a second liquid in a lower zone without substantial net transfer of liquid between the zones which comprises maintaining a continuous body of liquid throughout said zones, passing the solids gravitationally downwardly in contact with said first liquid in the upper zone, transferring a mixture comprising a loose mass of solid particles and liquid as a freely gravitating stream through a constantly open passageway of restricted cross-section from the upper zone to the lower zone, separating in the lower zone liquid from the solid particles and passing the solid particles gravitationally downwardly in contact with said second liquid, returning liquid as a separate stream from the lower to the upper zone in amount equivalent to the amount of fluid passing from the upper zone to the lower zone while utilizing as the sole driving force the kinetic energy of the solid particles downwardly gravitating from the upper to the lower zone, and regulating the rate of transfer of solids from the upper zone to the lower zone by variably regulating the rate of return of the separated fluid.

References Cited in the file of this patent

UNITED STATES PATENTS

| | | |
|---|---|---|
| 486,495 | Nibelius | Nov. 22, 1892 |
| 2,020,115 | Gray | Nov. 5, 1935 |
| 2,057,887 | Elliot et al. | Oct. 20, 1936 |
| 2,180,849 | Printz | Nov. 21, 1939 |
| 2,314,316 | Schlesman | Mar. 16, 1943 |
| 2,327,175 | Conn | Aug. 17, 1943 |
| 2,696,305 | Slover | Dec. 7, 1954 |
| 2,702,133 | Kilpatrick | Feb. 15, 1955 |